United States Patent
Wanielista et al.

(10) Patent No.: US 7,927,484 B2
(45) Date of Patent: Apr. 19, 2011

(54) PASSIVE UNDERGROUND DRAINFIELD FOR SEPTIC TANK NUTRIENT REMOVAL USING FUNCTIONALIZED GREEN FILTRATION MEDIA

(75) Inventors: Martin P. Wanielista, Winter Park, FL (US); Ni-Bin Chang, Winter Springs, FL (US); Ammarin Makkeasorn, Winter Springs, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 238 days.

(21) Appl. No.: 12/208,617

(22) Filed: Sep. 11, 2008

(65) Prior Publication Data
US 2010/0059437 A1   Mar. 11, 2010

(51) Int. Cl.
*C02F 3/00* (2006.01)
*C02F 3/04* (2006.01)

(52) U.S. Cl. ............... 210/170.08; 210/532.2; 210/679; 210/903; 210/906

(58) Field of Classification Search ............. 210/170.01, 210/170.08, 747, 532.2, 679, 691, 903, 906
See application file for complete search history.

(56) References Cited

U.S. PATENT DOCUMENTS

| | | | |
|---|---|---|---|
| 5,014,462 A | 5/1991 | Malmgren et al. | |
| 5,509,230 A | 4/1996 | Miyachi et al. | |
| 5,823,711 A | 10/1998 | Herd et al. | |
| 5,958,239 A * | 9/1999 | Sing | 210/605 |
| 6,214,229 B1 | 4/2001 | Robertson | |
| 6,458,179 B1 | 10/2002 | Puskarich | |
| 6,969,469 B1 | 11/2005 | Xie | |
| 7,288,190 B2 * | 10/2007 | Presby | 210/170.08 |
| 2004/0112809 A1 * | 6/2004 | Hassett | 210/150 |
| 2006/0124540 A1 * | 6/2006 | Austin et al. | 210/602 |
| 2008/0203002 A1 * | 8/2008 | Potts | 210/170.08 |

OTHER PUBLICATIONS

Birch, G.F., Fazeli, M.S., and Matthai, C., Efficiency of an infiltration basin in removing contaminants from urban stormwater. Environmental Monitoring and Assessment, 2005, pp. 22-38, vol. 101.

Clark, S., Pitt, R., and Broan, D., Effect of anaerobiosis on filter media pollutant retention, Presented at the Engineering Foundation and the American Society of Civil Engineers Conference on Information & monitoring needs for evaluating the mitigation effects of BMP's, Snowmass, CO, 2001.

(Continued)

*Primary Examiner* — Fred Prince
(74) *Attorney, Agent, or Firm* — Brian S. Steinberger; Phyllis K. Wood; Law Offices of Brian S. Steinberger, P.A.

(57) ABSTRACT

Methods, systems and compositions for a green sorption media for bioretention soil amendments in drainfields for on-site waste water systems filled with the green sorption media to foster an anaerobic or anoxic environment saturated. The green sorption media includes one or more recycled materials, including tire crumb, sawdust, orange peel, coconut husks, leaf compost, oyster shell, soy bean hulls and one or more naturally occurring materials including peat, sands, zeolites, and clay. The wastewater filtration system for a passive drainfield includes the green sorption material mixture, a cell including baffled compartments and a riser, the cell filled with green sorption material mixture to provide an alternating cycle of aerobic and anoxic environments, an influent distribution system to distribute the influent over the cell, and a piping system arranged for dosing the cell to sustain the functionality of the green sorption material mixture to remove nutrient content in wastewater.

12 Claims, 5 Drawing Sheets

OTHER PUBLICATIONS

DeBusk, T.A., Langston, M.A., Schwegler, B.R., and Davidson, S., An evaluation of filter media for treating storm water runoff, Proceedings of the fifth Biennial Storm water Research Conference, 1997, pp. 82-89.

Darbi, A., Viraraghavan, T., Butler, R., and Corkal, D., Batch studies on nitrate removal from portable water, Water South Africa, 2002, pp. 319-322, vol. 28, No. 3.

Florida Department of Health, Wekiva Basin Onside Sewage Treatment and Disposal System study. Department of Onsite sewage program. Available at the internet at: http://www.doh.state.fl.us/environment/////ostds/wekiva/wekivastudyrtp.pdf, 2004.

Forbes, M.G., Dickson, K.L., Saleh, F., Doyle, R.D., Hudak, P., and Waller, W.T., Recovery and fractionation of phosphate retained by lightweight expanded shale and masonry sand used as media in subsurface flow treatment wetlands, Environmental Science & Technology, 2005, pp. 4621-4627, vol. 39, No. 12.

Gungor, K. and Unlu, K., Nitrite and nitrate removal efficiencies of soil aquifer treatment columns, Turkish J. Eng. Env. Sci., 2005, pp. 159-170, vol. 29.

Hsieh, C.H. and Davis, A.P., Multiple-event study of bioretention for treatment of urban storm water runoff, Diffuse Pollution Conference Dublin, Ireland, 2003.

Kim, H., Seagren, E.A., and Davis, A.P., Engineered Bioretention for Removal of Nitrate from Storm water Runoff, in WEFTEC 2000 Conference Proceedings on CDROM Research Symposium, Nitrogen Removal, Session 19, Anaheim CA, Oct. 2000.

Korkusuz, E.A., Beklioglu, M. and Demirer, G.N., Use of blast furnace granulated slag as a substrate in vertical flow reed beds: field application, Bioresourse Technology, 2007, pp. 2089-2101, vol. 98.

Lisi, R.D., Park, J.K., and Stier, J.C., Mitigating Nutrient Leaching with a Sub-Surface Drainage Layer of Granulated Tires. Waste Management, 2004, pp. 831-839, vol. 24, No. 8.

Mothersill, C.L., Anderson, B.C., Watt, W.E., and Marsalek, J., Biological filtration of stormwater: field operations and maintenance experiences. Water Quality Research Journal Canada, 2000, pp. 541-562, vol. 35, No. 3.

Peterjohn, W.T., Adams, M.B., and Gilliam, F.S., Symptoms of nitrogen saturation in two central Appalachian hardwood forest ecosystems. Biogeochemistry, 1996, pp. 507-522, vol. 35.

Sengupta, S. and Ergas, S.J., Autotropic biological denitrification with elemental sulfur or hydrogen for complete removal of nitrate-nitrogen from a septic system wastewater, a report submitted to The NOAA/UNH cooperative institute for costal and estuarine environmental technology (CICEET), 2006.

Savage, A.J., and Tyrrell, S.F., Compost liquir bioremediation using waste materials as biofiltration media, Bioresource Technology, 2005, pp. 557-564, vol. 96.

World Health Organization (WHO), Guidelines for Drinking-water Quality, 1st Addendum to the 3rd ed., vol. 1: Recommendations, World Health Organization, Geneva, 2006.

\* cited by examiner

PASSIVE UNDERGROUND DRAINFIELD FOR SEPTIC TANK NUTRIENT REMOVAL USING FUNCTIONALIZED GREEN FILTRATION MEDIA

FIELD OF THE INVENTION

The invention relates to wastewater treatment and, in particular, to methods and systems and compositions for on-site wastewater treatment using a combination of recycled materials and natural sorption and filter media for the removal of nutrients from septic tank effluent, including phosphorus and nitrogen that are harmful to the environment.

BACKGROUND AND PRIOR ART

Nitrate in drinking water systems usually originates from fertilizers or from animal or human wastes. Nitrate concentrations in the natural water system tend to be highest in areas of intensive agriculture or where there are many septic systems. High nitrogen and phosphorus content in the water body has impeded water reuse potential and impacted ecosystem integrity and human health. Nitrate ($NO_3^-$) can potentially be toxic and can cause human health problem such as methemoglobinemia, liver damage and possible cancers according to a World Health Organization, 2006 report. Phosphorus can potentially trigger the eutrophication issues in fresh water bodies, which could result in toxic algae and endanger the source of drinking waters eventually (ESA, 2000).

When urban regions gradually expand due to regional development, centralized sewage collection, treatment, and disposal is often unavailable for both geographic and economic reasons. Thus, decentralized or on-site wastewater treatment systems (OWTS) may be necessary to protect public health. Nationwide, wastewater effluent from on-site wastewater treatment systems can represent a large fraction of nutrient loads to groundwater aquifers.

In the modern era, on-site wastewater treatment systems also referred as septic system primarily includes a septic tank and soil adsorption field or drainfield also known as subsurface wastewater infiltration systems. Drainfields are located in permeable, unsaturated natural soil or imported fill material so wastewater can infiltrate and percolate through the underlying soil to the ground water thereby treating itself through a variety of physical, chemical, and microbiological processes. However, the nitrate ion ($NO_3^-$) and soil are negatively charged, and so the $NO_3^-$ ion is not bound to the soil. Therefore, nitrate ions move freely with the soil solution and are readily leachable. Nitrogen, particularly nitrates, easily moves from terrestrial ecosystems into surface and groundwater, including lakes, streams, rivers, and estuaries as described in Peterson et al., Symptoms of nitrogen saturation in two central Appalachian hardwood forest ecosystems. Biogeochemistry 35, pp. 507-522 (1996).

Two important processes that result in the transformation of nitrate are nitrification and dentrification. Nitrification is a process in which ammonium is oxidized and denitrification is a process in which nitrate is reduced back to nitrogen gas before escaping into the air. However, only denitrification that is a microbiologically mediated process occurring under anaerobic (oxygen depleted) conditions can result in the permanent removal of nitrate. Approximately, 55-85% of the nitrogen that enters the septic tank is available to ground water mainly in the form of nitrates as described in Stoltz and Reneau, Potential for Contamination of Ground and Surface Waters from On-site Wastewater Disposal Systems (1998).

Based on recent Florida research data, a family of four discharges approximately 11.36 Kg (25 pounds) of nitrogen (measured in the form of nitrates) per year into the drainfield of a conventional onsite sewage treatment and disposal system according to a Florida Department of Health report dated 2004.

The main risks of nitrates pollutants are in "Blue baby" syndrome and suspected carcinogenic effect of nitrates on humans, and the nutrient enrichment of receiving waters. It has regulatory health limits in the United States of maximum contamination level (MCL) of 10 mg-N $L^{-1}$. A septic tank with a conventional drainfield does not typically remove nitrogen in the form of nitrates since it is very soluble and does not sorb well to soil components during infiltration.

The use of different sorption media in septic tank drainfields turns out to be an appealing engineering approach in dealing with the increasing trend of higher nitrate concentrations that is expected to continue in the surface and groundwater systems. Besides, the use of the sorption media for denitrification rather than traditional gravel-filled drainfield for handling the effluents from the septic tank system would become a new focus in rural communities. Large-scale implementation with different sorption media to remove nutrients will be popular in the future. See Mothersill, C. L., Anderson, B. C., Watt, W. E., and Marsalek, J., Biological filtration of stormwater: field operations and maintenance experiences and Birch, G. F., Fuseli, M. S., and Matthias, C., Efficiency of an infiltration basin in removing contaminants from urban stormwater. Environmental Monitoring and Assessment, 101, pp. 23-38, (2005).

It is believed that functionalized sorption media might have a better ion exchange capacity to support adsorption/desorption capacity. Research that lead to the subject matter of the present invention included screening sorption media via a thorough literature review, characterization of the selected sorption media, and examination of their sorption capacity for nutrient removal using column study, isotherm tests and microcosm assessment in support of the new underground drainfield design as an integral part of modern septic tank system.

Many researchers had tried to remove nitrogen species by using sorption media. Kim, H., Seagren, E. A., and Davis A. P., Engineering Bioretention for Removal of Nitrate from Storm water Runoff, in WEFTEC 2000 Conference Proceedings on CDROM Research Symposium, Nitrogen Removal, Session 19, Anaheim Calif., October (2000) used different kinds of sorption media, such as alfalfa, mulch compost, newspaper, sawdust, wheat straw, wood chips for nitrate removal from storm water runoff. They found that alfalfa and newspaper had 100% nitrate removal efficiency but mulch compost had 60% nitrate removal efficiency. They also found that sawdust, wheat straw and wood chips had good removal efficiency greater than 95% but wood chips showed consistently better performance in nitrate removal over sawdust. From their experiment, it could be concluded that all of these were electron donors and good carbon sources for promoting denitrification. They suggested that increasing the retention time may gain better removal efficiency. Kim et al. also found that soil could only remove 7% to 10% of nitrate due to its anionic form.

Güngör, K. and Ünlü, K., 2005. Nitrite and nitrate removal efficiencies of soil aquifer treatment columns, Turkish J. Eng. Env. Sci., 29, pp. 159-170, (2005) conducted nitrate and nitrite removal experiment by using only three types of soils, including sandy clay loam, loamy sand and sandy loam. They found significant nitrate and nitrite removal (i.e., over 90%). Hsieh, C. H. and Davis, A. P., Multiple-event study of bioretention for treatment of urban storm water runoff, Diffuse Pollution Conference Dublin, Ireland (2005) found that mulch was very effective in removing nitrate, unlike sand. But they had not gained good ammonia removal efficiency by using mulch. They concluded that soil with higher silt/clay and cation (Mg/Ca/K) contents might be very effective in nutrient removal. They also concluded that course media might not be able to retain the nutrient in repetitive loading due to small surface area so that sand should not be used.

Darbi, A., Viraraghavan, T., Butler, R., and Corkal, D., Batch studies on nitrate removal from potable water, Water South Africa, 28(3), pp. 319-322, (2002) used sulfur and limestone for nitrate removal from potable water. In their experiment, sulfur was used as an electron donor and limestone was used to maintain the pH. They found that the optimum mixing ratio of sulfur and limestone is 1:1 for nitrate removal (i.e., about 98% nitrate removal was observed). They also suggested that increasing the retention time may obtain higher nitrate removal efficiency. Eisi, R.D., Park, J. K., and Stier, J. C., Mitigating Nutrient Leaching with a Sub-Surface Drainage Layer Of Granulated Tires. Waste Management, 24(8), pp. 831-839, (2004) tried to use granulated tire for the removal of nitrate. They found 48.000 g of tire crumb can remove 16.2 g of $NO_3^-$—N. Sengupta, S. and Ergas, S. J., describe Autotrophic biological denitrification with elemental sulfur or hydrogen for complete removal of nitrate-nitrogen from a septic system wastewater.

The NOAA/UNH cooperative institute for costal and estuarine environmental technology (2006) did an experiment to remove nitrate from wastewater by using marble chips, limestone and oyster shell. Their experiment gave some significant outcomes about using those solids as sorption media. They found that oyster shell containing almost 98% $CaCO_3$ and limestone could remove 80% and 56% of nitrate, respectively. The pH and alkalinity were higher in testing using oyster shell rather than limestone and marble chips. Oyster shell was efficient to reduce nitrite accumulation and dissolved oxygen did not work as a denitrification inhibitor when oyster shell was used as a sorption media. From these findings, it can be concluded that oyster shell is much more effective than limestone or marble chips for removing nitrate. Oyster shell can also be a good candidate for controlling the pH that is sensitive for denitrification.

Savage A. J. and Tyrrel, S. F., 2005. Compost liquor bioremediation using waste materials as biofiltration media, *Bioresource Technology*, 96, pp. 557-564 (2005) used wood mulch, compost, soil, broken brick and polystyrene packaging for removal of $NH_3$—N from compost leachate. They reached a conclusion that wood mulch (75%) and compost (55%) had better removal efficiency for $NH_3$—N that other media and polystyrene was the least capable one to remove $NH_3$—N. Soil and broken brick could remove 38% and 35% of $NH_3$—N, respectively. All these media had the same capability to remove BOD, by microbial oxidation process. The research group found that compost and wood mulch had a tendency to increase the pH. They concluded that specific surface area, void space, permeability, and adsorption capacity might influence the removal efficiency.

Phosphorus removal from storm water is both precipitation and adsorption processes due to chemical reaction. As phosphorus has enormous effect on aquatic ecosystem, researchers have been trying to discover an economically feasible removal procedure. Some functionalized sorption media that can be used for phosphorus removal are sand rich with Fe, Ca or Mg, gravel, limestone, shale, light weight aggregates (LWA), zeolite (natural mineral or artificially produced alumino silicates), pelleted clay (along or in combination with soils), opaka (a siliceous sedimentary rock), pumice (natural porous mineral), wollastonite (a calcium metasilicate), fly ash, blast furnace slag (BFGS—a porous non-metallic co-product in iron industry), alum, goethite (a hydrous ferric oxide), hematite (a mineral form of iron(III) oxide), dolomite and calcite as described in Korkusuz, E. A., Beklioglu, M., and Demirer, G. N., Use of blast furnace granulated slag as a substrate in vertical flow reed beds; field application, Bioresourse Technology, 98, pp. 2089-2101, (2007).

DeBusk, T. A., Langston, M. A., Schwegler, B. R., and Davidson, S., 1997 describes an evaluation of filter media for treating storm water runoff, Proceedings of the fifth Biennial Storm water Research Conference, pp. 82-89 (1997) used sand with quartz, fresh organic peat soil, crushed lime rock (2.5 cm nominal size) and wollastonite (a mine containing calcium metasilicate plus ferrous metasilicate) to remove phosphorus, nickel and cadmium from storm water. They found that wallastonite had very good removal efficiency for their targeted contaminants. Wallastonite could remove about 87.8% P, 97.7% Cd and 80.3% Ni. On the other hand, limerock, peat and sand could remove 41.4%, 44%, and 41.4% P respectively. It was concluded that wallastonite is very effective in phosphorus removal because it contains calcium and ferrous ions. Calcium and ferrous ions can remove phosphorus by precipitation reaction or adsorption.

Hsieh and Davis (2003) found good total phosphorus (TOP) removal (about 41% to 48) by sand and concluded that it might happen due to simple adsorption or complex sorption/precipitation processes. They found that mulch was not a good candidate for TP removal. This research group concluded that TP removal was highly variable and it might be related to properties of sorption media used and flow pattern of nutrient laden water through the sorption media. Again, organic matter could also accelerate TP removal up to 93%.

Clark, S., Pitt, R., and Brown, D., Effect of anaerobiosis on filter media pollutant retention, Presented at the Engineering Foundation and the American Society of Civil Engineers Conference on Information & monitoring needs for evaluating the mitigation effects of BMPs, Snowmass, Colo. (2001) tried to remove contaminants in aerobic and anaerobic conditions from storm water runoff by using activated carbon, peat moss, compost and sand. They found good phosphorus removal efficiency by all four media in both conditions. They also found no desorption condition in their system for phosphorus. But they observed that sorption was better and leaching was lesser in aerobic condition for compost.

Forbes, M. G., Dickson, K. I., Saleh, F., Doyle, R. D., Hudak, P., and Waller W. T., Recovery and fractionation of phosphate retained by lightweight expanded shale and masonry sand used as media in subsurface flow treatment wetlands, Environmental Science & Technology, 39(12), pp. 4621-4627 (2005) used lightweight expanded shale and masonry sand for the removal of phosphorus. They summarized that sand is a poor candidate for retaining phosphorus and expanded shale has greater removal efficiency due to its larger surface area.

Researchers have used a variety of sorption media to remove nutrient, both nitrogen and phosphorus species, from storm water and wastewater. For removing nitrogen and phosphorus from storm water or wastewater, these filtration media can be further classified based on the derivation from: 1) plants or processed from components of plants; 2) sand and clay; 3) minerals; and 4) waste materials that may be recycled from the society.

Known prior art patents include U.S. Pat. No. 6,458,179 issued Oct. 1, 2002 for the use of shredded rubber as one material in a fertilizer; U.S. Pat. No. 5,823,711 issued Oct. 20, 1998 discloses use of scrap and shredded tires for improved drainage; U.S. Pat. No. 5,509,230 issued Apr. 23, 1996 discloses a lawn protecting method and elastic body for lawn protection used to minimize compaction under turf grasses; U.S. Pat. No. 5,014,462 issued May 14, 1991 discloses use of a soil amendment with rubber particles for increased porosity and reduced compaction; U.S. Pat. No. 6,969,469 issued Nov. 29, 2005 is directed toward a method of using waster tires as a filter media in a water treatment filtering device; and U.S. Pat. No. 6,214,229 issued on Apr. 10, 2001 discloses a treatment system for removing phosphorus from electric parts.

SUMMARY OF THE INVENTION

A primary objective of the present invention is to provide methods, systems and compositions for removing nitrogen and phosphorus found in septic tank effluent that are harmful to the environment using materials, compositions, and substances with different adequate recipes of green sorption media.

A secondary objective of the present invention is to provide methods, systems and compositions for an innovative passive underground drainfield that is highly sustainable to fit in any landscape and built environment on one hand, and highly applicable in dealing with any type of septic tank systems on the other hand.

A third objective of the present invention is to provide methods, systems and compositions for on-site wastewater treatment using a combination of recycled materials and natural sorption and filter media for the removal of nutrients from septic tank effluent, including phosphorus and nitrogen that are harmful to the environment.

A fourth objective of the present invention is to provide methods, systems and compositions for on-site wastewater treatment removing nutrients using mixtures of materials that provide for sorption, ion exchange, chemical precipitations, biological removal and filtration along with other processes in a well configured anoxic environment.

A fifth objective of the present invention is to provide methods, systems and compositions for on-site wastewater treatment using flexible apparatus, devices, and utility with a lower maintenance burden and cost impact.

A sixth objective of the present invention is to provide methods, systems and compositions for wastewater treatment and management using microbiological species to convert various species of nitrogen to nitrogen gases and custom mixes of materials based on the waste stream nutrient characteristics, residence time, and the projected life of the application.

A seventh objective of the present invention is to provide methods, systems and extended applications for wastewater treatment and management for sources of nitrogen and phosphorus including industrial domestic, agricultural overland flows, aquaculture operation, including shrimp farm, fish farm, forest clearance, and geothermal inflows that might end up as enrichment of groundwater aquifers.

A first embodiment of the present invention provides a wastewater filtration system for a passive drainfield. The system includes a green sorption material mixture consisting of one or more recycled materials mixed with one or more of a naturally occurring materials, a wetland cell filled with the green sorption material mixture to provide an anoxic environment, the wetland cell including baffled compartments and a riser to host the anoxic environment, an influent distribution system to distribute the influent over the wetland cell, and a piping system arranged for dosing the wetland cell to sustain the functionality of the green sorption material mixture in the passive drainfield to remove a nutrient content in wastewater. Proper design of hydraulic residence or retention time with appropriate baffled compartments and rise must be well configured to host an anoxic environment.

The group of recycled materials includes tire crumb, sawdust, orange peel, coconut husks, leaf compost, oyster shell, and soy bean hulls tree bark, wood chips, paper, alfalfa, mulch, cotton and wheat straw and the group of naturally occurring materials includes peat, sands, zeolites and clay. In an embodiment, the green sorption material mixture includes approximately 68% fine sand, approximately 25% tire crumb, and approximately 7% sawdust by volume. In another embodiment, the green sorption material mixture includes approximately 689% fine sand, approximately 25% tire crumb, and approximately 6% paper/newspaper by volume. In an embodiment, one of the one or more recycled materials is selected from a subgroup including sawdust and paper as electron donors in a drainfield and the recycled material is tire crumb for nutrient removal based on an adsorption capacity of the tire crumb.

The filtration system can be an on-site wastewater treatment system, a passive underground drainfield to remove a nutrient content in septic tank effluents and other waste streams in contaminated wastewater/groundwater systems, a passive underground drainfield to remove a nutrient content in contaminated wastewater/groundwater system, a septic tank system, and/or an in-situ remediation of nitrate and ortho-phosphate contaminated in groundwater.

A second embodiment provides a method for on-site wastewater treatment including the steps of providing a wetland cell including baffled compartments and a riser to host the anoxic environment, mixing one or more recycled material selected from a group consisting essentially of tires, sawdust and food waste and one or more naturally occurring materials as a green sorption material mixture, filling the horizontal underground cell with a green sorption material mixture to provide an anoxic environment, and providing a piping system for dosing the cell with an influent to sustain the functionality of the green sorption material mixture in the passive drainfield to remove a nutrient content in wastewater.

In an embodiment, the method is used in conjunction with underground septic tank systems as an alternating cycle of aerobic and anoxic environments to remove nutrient content from the influent. Some vertical pipes for venting in the beginning close to the header pipe will induce some amount of air into the initial cell so that the aerobic environment can be promoted periodically when needed. This will trigger the nitrification and denitrification processes as expected. Because of this invention, there is no need to separate the nitrification and denitrification processes into two tanks and indirectly achieve the goal of cost effectiveness.

Figure 5:
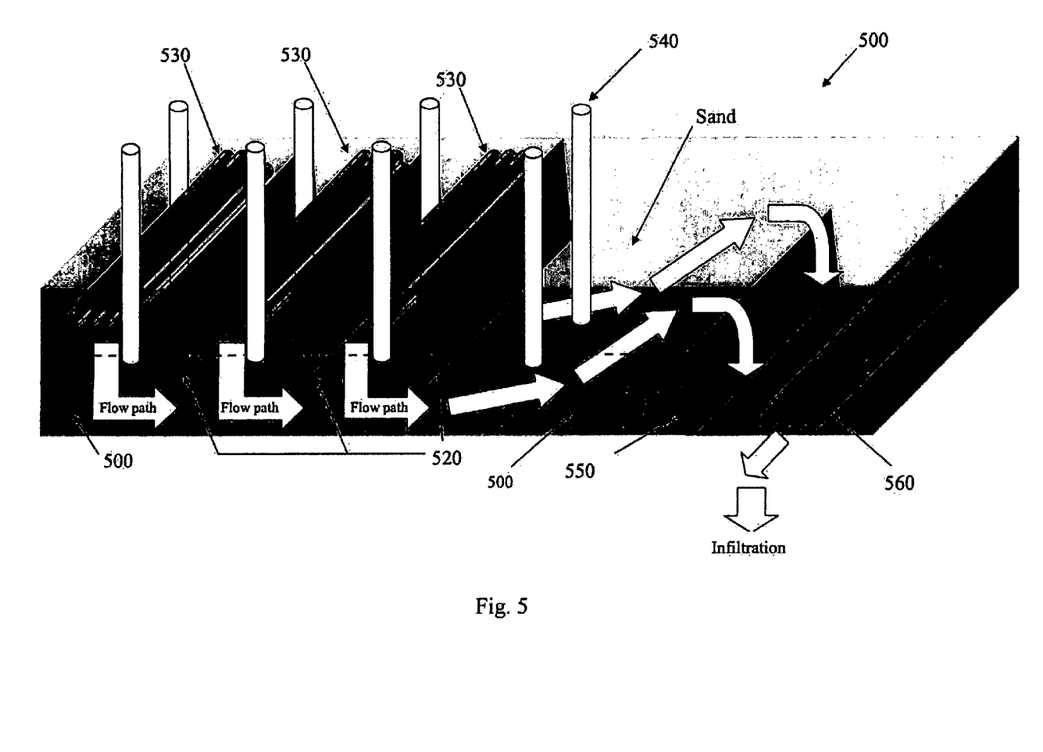
FIG. 5 shows an example of a passive underground drainfield according to the present invention.

A third embodiment provides a passive underground drainfield including an underground drainfield filled with a green sorption media and portioned by one or more baffles located on the sorption media to create one or more open channels, the baffles guiding a flow of influent following the flow path shown through the open channel into the sorption media. The system includes a distribution system for directing an influent into the underground drainfield, the distribution system including perforated inlet pipes in each of the one or more open channels to promote aeration to maintain an aerobic condition in each channel and an air inlet port 540 in each of the one or more channels for drawing air for nitrification for an anoxic and aerobic environment where denitifcation occurs. A riser located at one end of the underground drainfield in the sorption media and extending a distance above the sorption media into the sand area, the riser having a riser height less than a baffle height, the influent directed into each of the one or more open channels passing through the sorption media toward the riser, effluent passing over the riser; and a perforated outlet pipe on an opposite side of the riser, the effluent passing through the outlet pipe for disposal.

Further advantages of this invention will be apparent from the following detailed description of preferred embodiments which are illustrated schematically in the following section.

DESCRIPTION OF THE PREFERRED EMBODIMENTS

Before explaining the disclosed embodiments of the present invention in detail it is to be understood that the invention in the context of a utility patent is not limited in its application to the details of the particular arrangements shown in this document since the invention is capable of other embodiments. Also, the terminology used herein is for the purpose of description and not of limitation. This invention is related to co-pending U.S. patent application Ser. No. 12/200, 140 filed on Aug. 28, 2008 which is incorporated by reference.

The following descriptions focus on how these developed recipes using green sorption media can help improve the performance of nutrient removal in septic tank system as examples at University of Central Florida (UCF), in Orlando Fla.

Initially, the possible sorption media were screened through the following five criteria: 1) the relevance of denitrification process, 2) the removal efficiency as evidenced in the literature with regard to adsorption, 3) the cost level, 4) the availability, 5) low maintenance and 6) additional environmental benefits. Four sorption media were selected for final consideration according to a multi-criteria decision making (MCDM) process. The four sorption media include sawdust/wood chip, paper/newspaper, tire crumb and astatula sand (citrus grove sand). The two media mixes selected for use in the column tests are denoted as recipe 1 which consists of approximately 68% fine sand, approximately 25% tire crumb, and approximately 7% sawdust, and recipe 2 which is composed of approximately 69% fine sand, approximately 25% tire crumb, and approximately 6% paper/newspaper by volume. The reason for using paper in recipe 2 to replace sawdust in recipe 1 is that the electron donor to triggering the denitrification process has to be present in the media. At the end of the column tests, recipe 1 was further used for isotherm study and also as a media blend for microcosm system study.

The ASTM D-421-85 Standard Practice for Dry Preparation of Soil Samples for Particle-Size Analysis and Determination of Soil Constants was used. The Multi-point BET specific surface area by nitrogen adsorption method with respect to each type of recipe independently were performed by Quantachrome Instruments, which generated the surface area for these two mixed recipes as an average in the end. ASTM C29/C29M-07—was applied for measuring the bulk density ("unit weight") and voids in soil and mixed media. ASTM D-854-92 Standard Test Method for Specific Gravity of Soils was applied for the determination of the specific gravity of solids and media that pass the 4.75-mm (No. 4) sieve.

Figure 1:
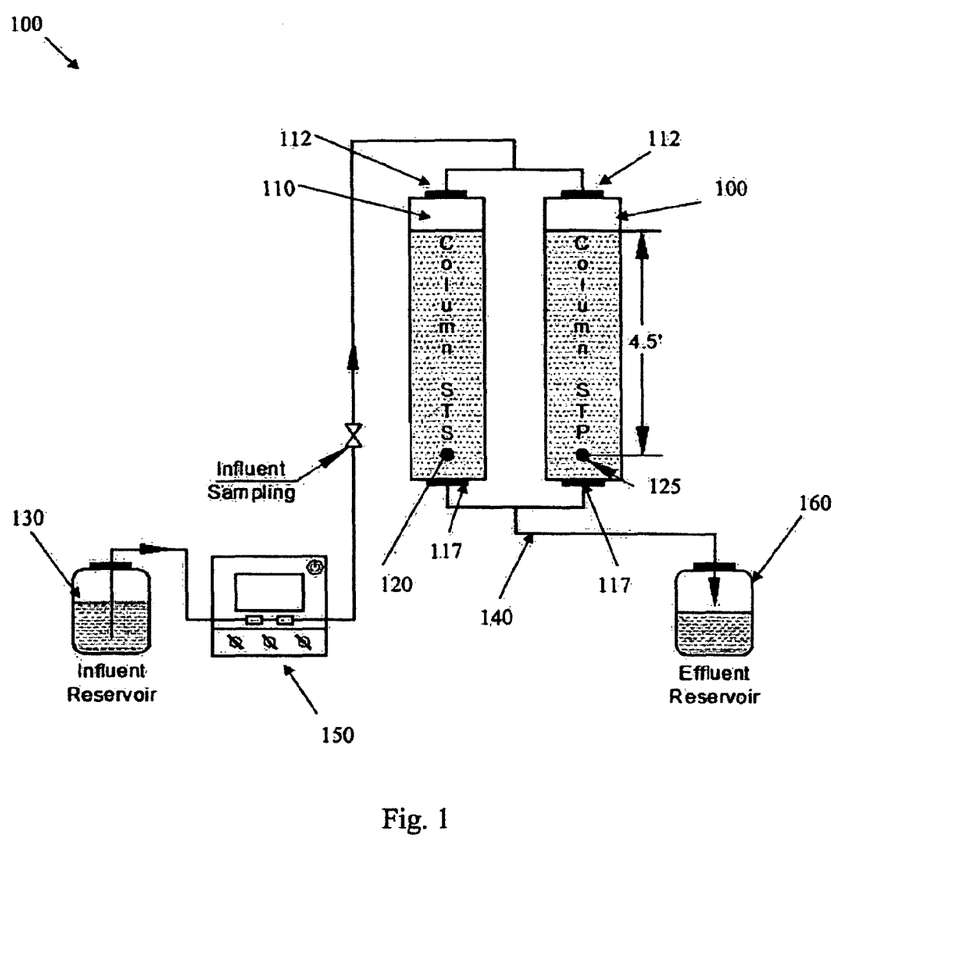
FIG. 1 is a schematic block diagram of a system used for the column test during the batch study.

A laboratory column test method is a physical model, which attempts to simulate, on a small scale, a portion of the real world subsurface environment under a controlled set of experimental conditions. Lab column tests were conducted using three (2) plexi-glass columns 110 and 115 as shown in FIG. 1. The columns 110 and 115 were approximately 0.29 m inner diameter and approximately 1.5 m height and with recipe—1 and recipe—2, respectively. The columns were packed in approximately 5 cm lifts by adding a pre-weighed dry sample. The final column porosity for both the columns was approximately 40%. For sampling ports, the columns were drilled with holes at approximately 1.37 m (4.5 ft) from the top of the media as shown in FIG. 1. Ball valves were used at the sampling ports 120 and 125 and the ball valves were water sealed.

The composition of the columns in terms of weight and volume were determined as shown in Table 1. The feed solution, raw wastewater from a functioning septic tank in Orlando, Fla., was stored for use in the column study. Raw wastewater was pumped from the influent reservoir 130 to the top of the columns as a continuous system. Each column was covered with a lid at the top 112 and bottom 117 and the discharge ports 140 were air tight to prevent direct contact of air thereby keeping the columns anoxic in condition. The flow of influent into the two columns was controlled through a control panel 150 and the effluent discharged from the bottom of each column drained into an effluent reservoir 160. The method of sampling included directly collecting effluent samples from the bottom 117 of the columns 110 and 115 at the sampling port 120 and 125, respectively. In this embodiment, the sampling ports 120 and 125 were air tight ball valves. The ball valves were opened and effluent samples were extracted. The influent and effluent samples were collected in sterilized plastic influent and effluent reservoir bottles 130 and 160 and were transported for water quality analysis to ERD lab. Table 1 shows the composition of columns in terms of weight and volume.

TABLE 1

|  | Column STS | | Column STP | |
| --- | --- | --- | --- | --- |
|  | wt % | vol % | wt % | vol % |
| Tire Crumb | 10.9 | 25.0 | 10.7 | 25.0 |
| Paper | — | — | 4.0 | 6.2 |
| Sawdust | 4.0 | 7.1 | — | — |
| Astatula Sand | 85.1 | 67.9 | 85.3 | 68.8 |

In table 1, STS is the acronym of Sand, Tire Crum and Sawdust (Recipe 1) and STP is the acronym of Sand, Tire Crum and Paper (Recipe 2).

Table 2 shows the results from the Column Study for Column STS and Column STP with Recipe 1 and Recipe 2 respectively. During the experimental period the columns did not show any signs of saturation with nutrients although the columns were loaded with high concentrations of nutrients with average total phosphorus concentration of 188 mg/L which is approximately thirteen fold than the average concentration of 14 mg/L for total phosphorus (USEPA, 2002) and average total nitrogen concentration of 415 mg/L which is approximately eight fold than the average concentration of 50 mg/L for total nitrogen (USEPA, 2002).

TABLE 2

|  | 19-Oct | 26-Oct | 10-Nov | 17-Nov | 30-Nov | 2-Feb | 26-Feb | 7-Mar | Avg Conc [mg/L] |
|---|---|---|---|---|---|---|---|---|---|
| Nitrates | | | | | | | | | |
| Influent | 0.27 | 0.31 | 3.02 | 3.49 | 3.10 | 0.16 | 0.21 | 1.95 | 1.56 |
| Recipe 1 | 0.04 | 0.06 | 0.08 | 0.02 | 0.15 | 0.01 | 0.01 | 0.02 | 0.05 |
| Recipe 2 | 0.03 | 0.06 | 0.11 | 0.08 | 0.86 | 0.08 | 0.01 | 0.03 | 0.16 |
| Average Percentage Removal (%); Recipe 1 = 97.0 & Recipe 2 = 90.1 | | | | | | | | | |
| Ammonia | | | | | | | | | |
| Influent | 4.9 | 27.8 | 1.5 | 119 | 112 | 10.7 | 72.9 | — | 49.7 |
| Recipe 1 | 0.3 | 3.7 | 0.7 | 4.1 | 4.4 | 6.7 | 10.8 | — | 4.4 |
| Recipe 2 | 0.1 | 0.2 | 0.0 | 0.1 | 0.8 | 0.9 | 11.0 | — | 1.9 |
| Average Percentage Removal (%); Recipe 1 = 91.2 & Recipe 2 = 96.2 | | | | | | | | | |
| Total Nitrogen | | | | | | | | | |
| Influent | 96.4 | 35.6 | 1135 | 488 | 689 | 678 | 126 | 67.5 | 414 |
| Recipe 1 | 6.2 | 6.4 | 5.3 | 4.2 | 5.2 | 6.9 | 12.1 | 10.3 | 7.1 |
| Recipe 2 | 5.1 | 7.0 | 6.5 | 5.7 | 5.4 | 1.1 | 15.9 | 0.9 | 6.0 |
| Average Percentage Removal (%); Recipe 1 = 98.3 & Recipe 2 = 98.6 | | | | | | | | | |
| Ortho Phosphorus | | | | | | | | | |
| Influent | 0.86 | 0.91 | 0.81 | 0.63 | 0.73 | 0.23 | 0.71 | 1.26 | 0.77 |
| Recipe 1 | 0.01 | 0.00 | 0.02 | 0.04 | 0.00 | 0.00 | 0.00 | 0.00 | 0.01 |
| Recipe 2 | 0.02 | 0.01 | 0.02 | 0.02 | 0.01 | 0.01 | 0.05 | 0.00 | 0.02 |
| Average Percentage Removal (%); Recipe 1 = 98.8 & Recipe 2 = 97.8 | | | | | | | | | |
| Total Phosphorus | | | | | | | | | |
| Influent | 6.8 | 4.2 | 705 | 195 | 550 | 36.1 | 3.2 | 2.1 | 188 |
| Recipe 1 | 0.15 | 0.06 | 0.23 | 0.09 | 0.18 | 0.09 | 0.08 | 0.14 | 0.13 |
| Recipe 2 | 0.21 | 0.08 | 0.19 | 0.15 | 0.21 | 0.19 | 0.07 | 0.07 | 0.15 |
| Average Percentage Removal (%); Recipe 1 = 99.9 & Recipe 2 = 99.9 | | | | | | | | | |
| BOD | | | | | | | | | |
| Influent | — | — | 2180 | 1475 | 7200 | 606 | 173 | 198 | 1972 |
| Recipe 1 | — | — | 240 | 45.0 | 405 | 85.0 | 36.9 | 52.0 | 144 |
| Recipe 2 | — | — | 751 | 750 | 833 | 342 | 2.00 | 48.0 | 454 |
| Average Percentage Removal (%); Recipe 1 = 92.7 & Recipe 2 = 76.7 | | | | | | | | | |

In the previous study by Davis, Hunho Kim, Eric A. Seagren, Engineered bioretention for removal of nitrate from stormwater runoff. Water Environ Res 75 no. 4 (2003), paper and sawdust showed some excellent results in terms of nitrate removal and were accepted as one of the best electron donors. In this research, sawdust and paper (newspaper) showed similar results and were just not limited to nitrates but also to total nitrogen, total phosphorus, ammonia, ortho-phosphorus and BOD. At the end of the experimental period, the newspaper print in the columns was still visible and most of the newspaper in the media mix remained similar in appearance to the original material.

These observations are consistent with other studies that indicate that newspaper is somewhat resistant to bacterial degradation under anoxic conditions (Cummings and Stewart, 1994; Volokita et al, 1996; Davis et al, 2003). This resistance seems to be the chemical composition of newspaper, in particular the relatively high lignin content. Tire crumb that was used for this research had a carbon content of 85% and did not have any metal content. Though tire crumb was never used as an individual media for the septic tank drainfield, the results indicate that it has a strong potential for creating an environmentally safe and value-added option for scrap tire reuse.

Overall, the green sorption media showed significant potential for pollutant removal in a septic tank drainfield. Throughout the experimental period, both columns showed approximately equal and consistent removal of more than 90% for all the water quality parameters (i.e., ortho-phosphorus, total phosphorus, nitrates, total nitrogen, ammonia, BOD).

An Isotherm study as a batch process experiment was carried out using recipe 1 to study the sorption of ortho-phosphorus and nitrates. It is helpful in determining the sorption capacity and also the estimated life of the media for the sorption of nutrients. For isotherm study of nitrates, five flasks were prepared containing approximately 100 gm of recipe 1 and nitrate solution of approximately 50 mL of 9.6 mg/L, 8.4 mg/L, 7.2 mg/L, 6.0 mg/L, 4.8 mg/L, $NO_3$—N was added in each of the five different flasks. The media mix and the solution were mixed thoroughly and kept for a residence time of twenty-four hours. After twenty-four hours, a nitrate solution was extracted from the media and analyzed.

For the isotherm study of ortho-phosphates, one flask was prepared containing 200 gm of recipe 1 and a phosphate solution of 100 mL of 4.12 mg/L. $PO_4$—P. The media mix and the solution were mixed thoroughly and again kept for a residence time of twenty-four hours. After twenty-four hours, the phosphate solution was extracted from the media and analyzed. Using the same media mix in the flask 100 ml of fresh 4.12 mg/L, PO$_4$—P was added to the flask and mixed thoroughly and resided for twenty-four hours. The previous step was repeated for six days using the same media mix and the extracted solutions from the media were analyzed.

Figure 4A:
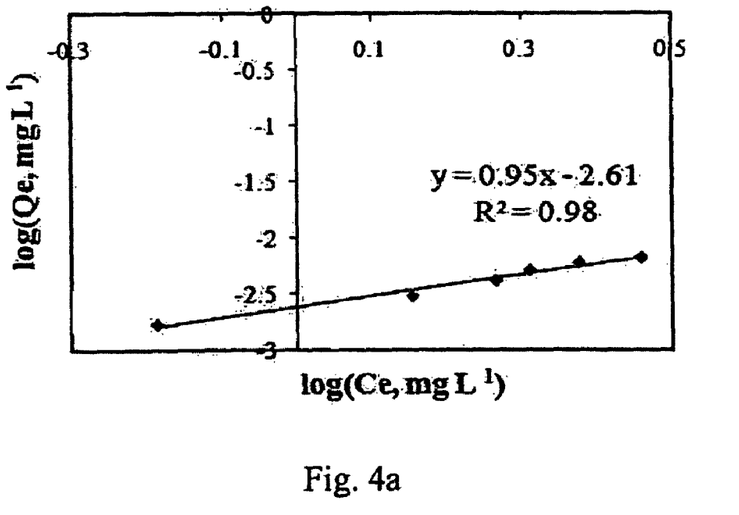
FIG. 4a shows the sorption results for phosphorus in a linear form of a Freundlich isotherm model.
Figure 4B:
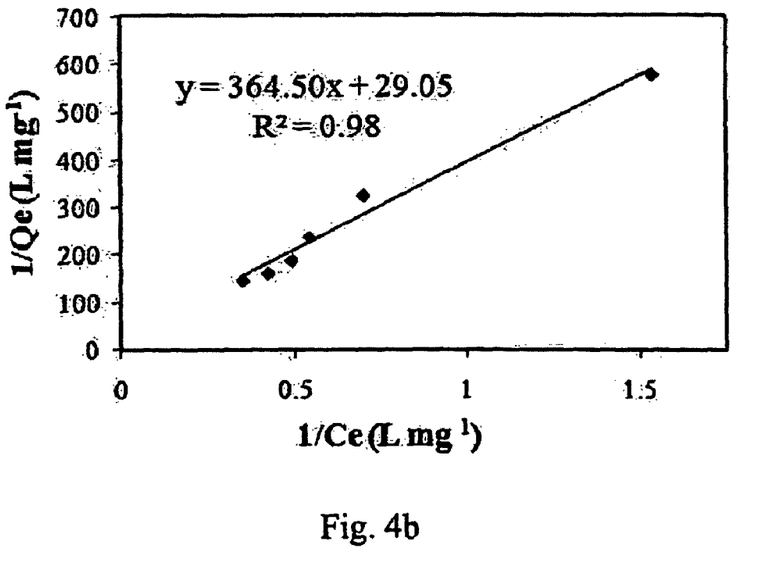
FIG. 4b shows the sorption results for phosphorus in a linear form of a Langmuir isotherm model.

The results for the nitrate and ortho-phosphate isotherm results are presented in Table 3a and Table 3b, respectively. It can be seen from Table 3a that there is very little or no removal of nitrates. It was concluded that the nitrates was not sorption by the sorption media and biological activity could not initiate as the batch studies were performed in twenty-four hours. However, substantial removal of phosphorus was observed from the batch tests. The sorption results for phosphorus were plotted for the linearized form of Langmuir and Freundlich Isotherm Model as shown in FIGS. 4a and 4b respectively. The linearized form of Langmuir and Freundlich isotherm models are as presented below:

TABLE 3a

| Sample | Mass Loading [mg] | Mass Removed [mg] |
| --- | --- | --- |
| 1 | 0.48 | 0.11 |
| 2 | 0.42 | 0.00 |
| 3 | 0.36 | 0.08 |
| 4 | 0.30 | 0.01 |
| 5 | 0.24 | 0.00 |

TABLE 3b

| Sample | Mass Loading [mg] | Mass Removed [mg] |
| --- | --- | --- |
| 1 | 0.41 | 0.35 |
| 2 | 0.41 | 0.27 |
| 3 | 0.41 | 0.23 |
| 4 | 0.41 | 0.21 |
| 5 | 0.41 | 0.17 |
| 6 | 0.41 | 0.12 |

Langmuir isotherm equation:

$$(1/Q_e) = (1/Q_{max}b) \times (1/C_e) + (1/Q_{max}) \quad (Eq.\ 1)$$

where: $Q_e$=Sorbed concentration [mass adsorbate/mass adsorbent]; $Q_{max}$=Maximum capacity of adsorbent for adsorbate [mass adsorbate/mass adsorbent]; b=Measure of affinity of adsorbate for adsorbent; $C_e$=Aqueous concentration of adsorbate [mass/volume].

Freundlich isotherm equation:

$$\log q_e = \log K + (1/n) \log C_e \quad (Eq.\ 2)$$

where: $q_e$=Sorbed concentration [mass adsorbate/mass adsorbent]; K=Capacity adsorbent [mass adsorbate/mass adsorbent]; $C_e$=Aqueous concentration of adsorbate [mass/volume]; n=Measure of how affinity for the adsorbate changes with changes in adsorption density.

Assume that monolayer coverage of phosphorus adsorbed to the media surface. From the graphical plots as shown in FIGS. 4a and 4b, the adsorption capacity for phosphorus from the Langmuir and Freundlich isotherm models were calculated to be 34.4 mg g$^{-1}$ and 0 mg g$^{-1}$ respectively. It is concluded that the Langmuir Equation fits better for the sorption of phosphorus.

Figure 3:
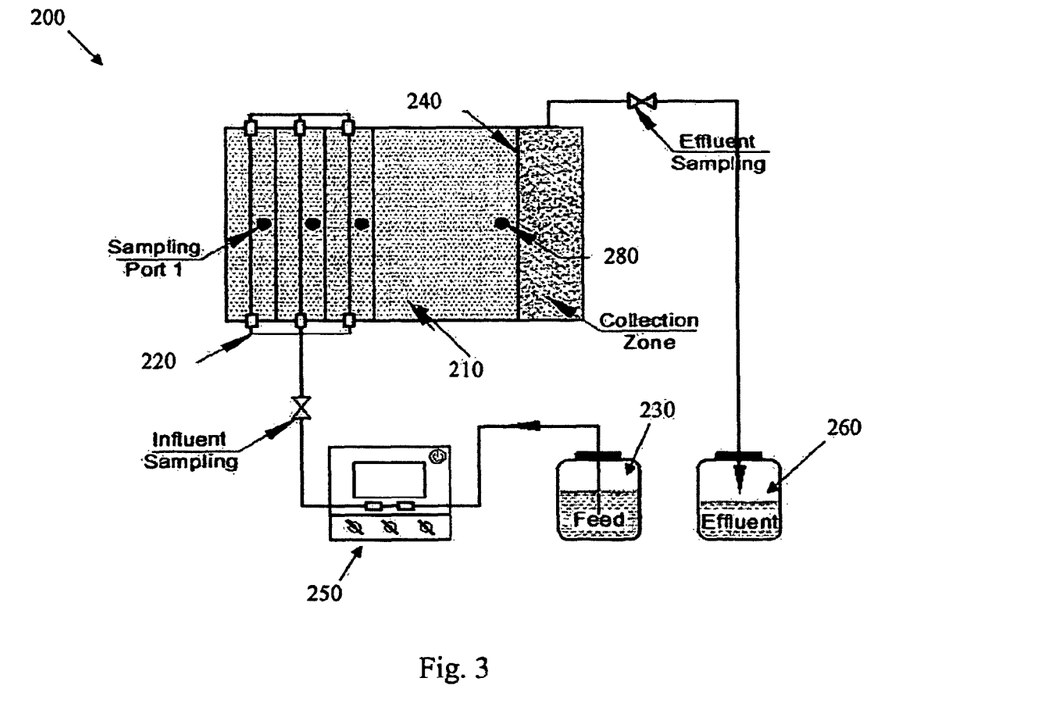
FIG. 3 is a schematic block diagram of an experimental design of a microcosm study.

A Microcosm model is a small, representative system having analogies to a larger system in constitution, configuration and development. A microcosm model was built with a rectangular plastic container having dimensions of Length=56 cm; Width=34.5 cm; Depth=15 cm. The model mainly consists of two zones, a treatment zone having a length of 46 cm and a collection zone of 10 cm. FIG. 3 shows the schematic diagram of the Microcosm model system 200.

The bottom 5 cm of the treatment zone 210 consists of recipe 1 and the remainder of the model was packed with astatula sand. Synthetic wastewater flows into the model through the perforated tubing 220 which, in this experiment, had an inner diameter of 0.3 cm that acts as header pipes and has a downward slope of approximately 1%. These perforated tubes 220 are engineered with holes and slots, allowing the tubes 220 to collect and disperse the wastewater from the influent reservoir 230 as it passes over the corrugations in the tubes 220. As the wastewater is distributed throughout the tubes 220, it trickles down into the media allowing partial biological breakdown before reaching the media.

The wastewater was retained in the media for a hydraulic retention time of seventy-two hours to provide the desired denitrification. The wastewater was retained in the treatment zone with the help of pre-fabricated riser 240 at approximately 46 cm length and approximately 6.5 cm in height as shown in FIG. 2. The model is operationally controlled with control panel 250 to run as a continuous system and effluent is collected from the collection zone 270 and/or sampled from the sampling port 280 connected with the effluent reservoir 260. Additionally, the locations of sampling ports 280 in the different compartments of the model are also shown in FIG. 2.

The permeability of the astatula sand was measured to be 55.0 cm/hr (21.6 in/hr). The permeability of recipe 1 and recipe 2 were measured to be 54.4 cm/hr (21.4 in/hr) and 59.4 cm/hr (23.4 in/hr), respectively. To determine the particle-size distribution a sieve analysis was performed. Table 4 lists the summary of material characterization of the astatula sand and the two recipes used for the column tests. Surface area of astatula sand, recipe 1 and recipe 2 were approximately 0.32 m$^2$ g$^{-1}$, 0.08 m$^2$ g$^{-1}$ and 0.18 m$^2$ g$^{-1}$ respectively. Surface areas were determined by a nitrogen sorption BET test (Quantachrome Instruments, Boynton Beach, Fla.). FIGS. 3a, 3b, and 3c shows the gradation curve of Astatula sand and two mixes used in our recipes comparatively.

TABLE 4

| | Astatula Sand | Recipe 1 | Recipe 2 |
| --- | --- | --- | --- |
| Density (g cc$^{-1}$) | 1.53 | 1.24 | 1.28 |
| Void Ratio (unit less) | 0.73 | 0.69 | 0.62 |
| Porosity (unit less) | 0.42 | 0.41 | 0.38 |
| Specific Gravity (Gs) | 2.65 | 2.32 | 2.15 |
| Surface Area (m2 g$^{-1}$) | 0.32 | 0.08 | 0.18 |
| Permeability (cm hr$^{-1}$) | 55.0 | 54.4 | 59.4 |

The results from the Microcosm model are shown in Table 5. The samples showed approximately 80% removal efficiency for nitrates and ortho-phosphorus. Additionally, the results also include the concentration and removal efficiency from sampling ports located in the different compartment of the model. It appears that most of the denitrification reactions occur in the last compartment before the riser in the microcosm in which a well fostered anoxic environment can be maintained throughout the operation. This observation is consistent with the system design philosophy.

TABLE 5

| | Nitrates | | | Ortho-Phosphorus | | |
| --- | --- | --- | --- | --- | --- | --- |
| | Concentration [mg/L] | % Removal | Cum % Removal | Concentration [mg/L] | % Removal | Cum % Removal |
| Influent | 2.38 | | | 1.28 | | |
| Sampling Port 1 | 2.33 | 1.87 | 1.87 | 1.15 | 10.17 | 10.17 |
| Sampling Port 2 | 2.26 | 2.91 | 4.79 | 1.02 | 10.67 | 20.84 |
| Sampling Port 3 | 1.72 | 22.68 | 27.47 | 0.76 | 20.33 | 41.17 |
| Sampling Port 4 | 0.49 | 52.03 | 79.50 | 0.23 | 40.91 | 82.08 |
| Effluent | 0.47 | 0.62 | 80.12 | 0.20 | 2.16 | 84.24 |

To determine the life of the green sorption media, which is applied as a 5 cm (2 inch) layer in the microcosm model, only two factors need to be known. These factors are the mass of the pollution control media and the phosphate mass loading rate per year. Knowing that the density of the green sorption media is 1.37 g $cc^{-1}$ (85.5 lbs $ft^{+3}$), the mass of media is 11,719 grams. Also knowing that the average concentration of phosphorus coming into the drainfield is around 14 mg $L^{-1}$ (see Colman, J. A., 2005, Response curves for phosphorus plume lengths from reactive-solute-transport simulations of onland disposal of wastewater in noncarbonated sand and gravel aquifers: U.S. Geological Survey Scientific Investigations Report 2004-5299, 28p) and daily flow of wastewater to the model was 1.25 L, the mass loading of phosphate year is determined to be about 6,388 mg $yr^{-1}$. Additionally, the adsorption capacity from the batch isotherm tests for phosphorus was estimated to be approximately 34.4 mg $g^{-1}$. The life of the green sorption media is calculated to be approximately 63 years.

Figure 2A:
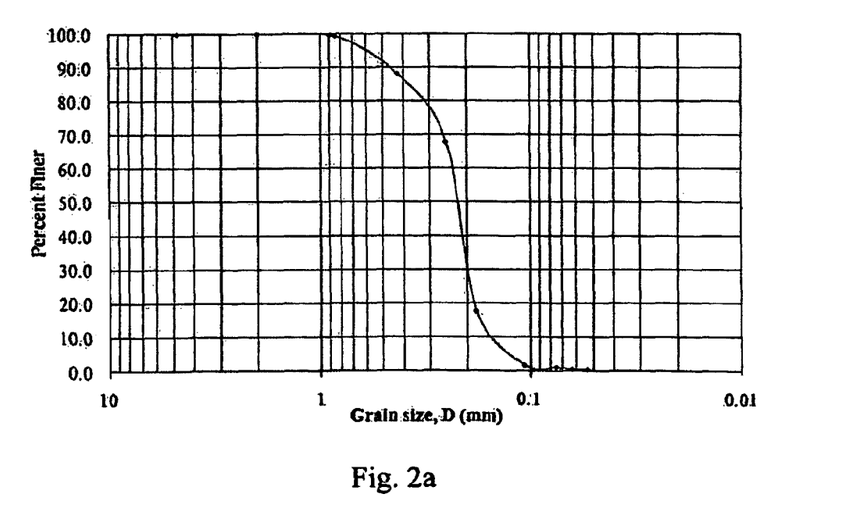
FIG. 2a is a graph showing the gradation curve for Astatula sand.
Figure 2B:
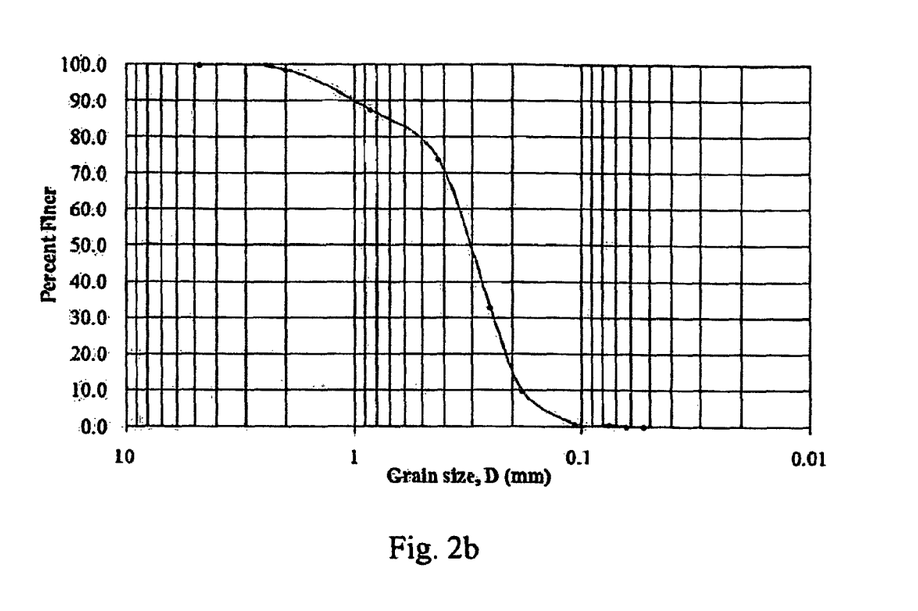
FIG. 2b is a graph showing the gradation curve for a first mixture used for material characterization.
Figure 2C:
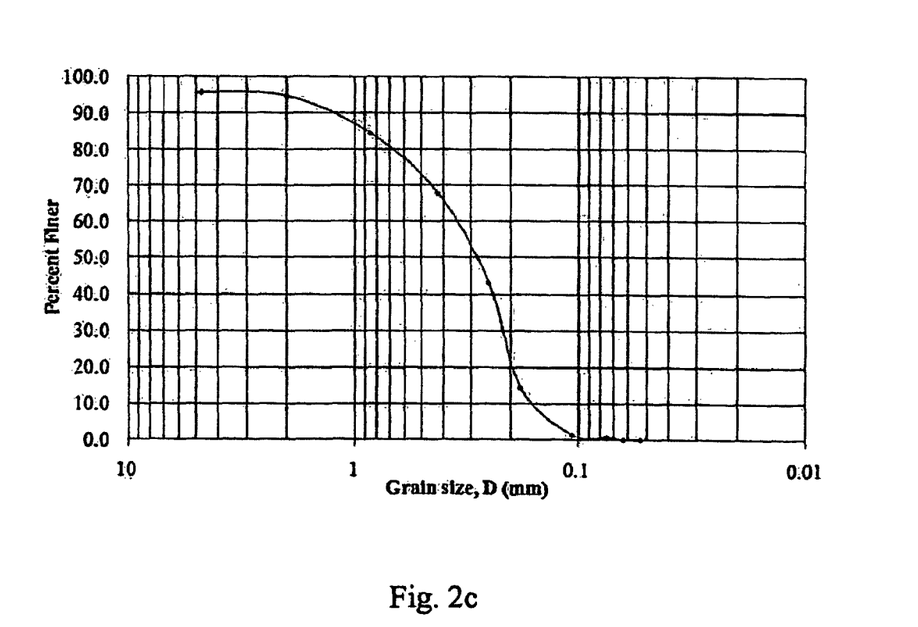
FIG. 2c is a graph showing the gradation curve for a second mixture used for material characterization.

The information generated in the present study is valuable for understanding the postulated development of green sorption media applied to solve the nutrient removal in an septic tank underground drainfield. Under the hydraulic retention time (HRT) of 24 hours, samples showed treatment efficiencies of greater than 90% for both columns for all pollutants of concerns (FIG. 1). The batch adsorption isotherm data was fitted in the Langmuir isotherm and Freundlich isotherm models, and adsorption capacity for phosphorus was found to be 34.4 mg $g^{-1}$ based on Langmuir isotherm (FIGS. 2a, 2b and 2c). A microcosm (FIG. 3) of the septic tank underground drainfield was built with one of the recipes applied in the column test as a continuous system dosed with synthetic wastewater.

Under the HRT of 72 hours, samples from the microcosm physical model showed more than 80% of removal efficiency for nitrates and phosphorus (FIGS. 4a and 4b). Additionally, with the aid of the isotherm tests, the life expectancy of the proposed sorption media in the microcosm physical model was estimated to be approximately 63 years for phosphorus sorption. The significant removal efficiencies of the target contaminants suggest that the use of the green sorption media is a suitable and powerful material for an in-situ remediation of nitrate and ortho-phosphate contaminated in groundwater. Overall, this research and experiments demonstrates the effectiveness of sawdust and paper as electron donors in a drainfield whereas tire crumb may have better adsorption capacity for nutrient removal.

An embodiment of the present invention provides a wastewater filtration system for a passive drainfield. The system includes a green sorption material mixture consisting of one or more recycled materials mixed with one or more of a naturally occurring materials, a wetland cell filled with the green sorption material mixture to provide an anoxic environment, the wetland cell including baffled compartments and a riser to host the anoxic environment, an influent distribution system to distribute the influent over the wetland cell, and a piping system arranged for dosing the wetland cell to sustain the functionality of the green sorption material mixture in the passive drainfield to remove a nutrient content in wastewater. Proper design of hydraulic residence or retention time with appropriate baffled compartments and riser must be well configured to host an anoxic environment. Such passive underground drainfield system can then possess the capability to effectively remove the nutrient-content in septic tank effluents and other waste streams in contaminated wastewater/groundwater systems.

The group of recycled materials includes tire crumb, sawdust, orange peel, coconut husks, leaf compost, oyster shell, and soy bean hulls, tree bark, woodchips, paper, alfalfa, mulch, cotton and wheat straw and the group of naturally occurring materials includes peat, sands, zeolites and clay. In an embodiment, the green sorption material mixture includes approximately 68% find sand, approximately 25% tire crumb, and approximately 7% sawdust by volume. In another embodiment, the green sorption material mixture includes approximately 69% fine sand, approximately 25% tire crumb, and approximately 6% paper/newspaper by volume. In an embodiment, one of the one or more recycled materials is selected from a subgroup including sawdust and paper as electron donors in a drainfield and the recycled material is tire crumb for nutrient removal based on an adsorption capacity of the tire crumb.

The filtration system can be an on-site wastewater treatment system, a passive underground drainfield to remove a nutrient content in septic tank effluents and other waste streams in contaminated wastewater/groundwater systems, a passive underground drainfield to remove a nutrient content in contaminated wastewater/groundwater system, a septic tank system, and/or an in-situ remediation of nitrate and ortho-phosphate contaminated in groundwater.

FIG. 5 shows the design drawing of this passive underground drainfield. Household sewerage can be directed into the underground drainfield with sorption media being placed in an open channel within the box partitioned by a few baffles. The total number of battles required depends on how long the retention time is needed. Spraying the sewerage in the front section of the manifold (inflow pipe) happens periodically. Perforated pipes at the front section can promote the aeration to maintain the aerobic condition at the first part of channel. Then the baffles can guide the flow through the open channel smoothly. While the first part of the channel consumes a lot of air for nitrification, the dissolved oxygen would gradually change to zero making the subsequent process anoxic and aerobic before the riser where denitrification may occur constantly. All sections before the riser in the open channel must be filled with sorption media to promote the targeted reactions. After having 3-5 days retention time, flow will eventually pass through a perforated outlet pipe that completely partitions the reaction box and the disposal box. Infiltrate will seep down into the vadose zone gradually in the end. This type of design can fit into both underground drainfield with soil substitution and elevated mound system associated with a variety of treatment processes. A pilot plant has been constructed at the University of Central Florida, Orlando, Fla.

The passive underground drainfield 500 shown in FIG. 5 includes an underground drainfield filled with a green sorption media 510 and portioned by one or more baffles 520 located on the sorption media 510 to create one or more open channels, the baffles 520 guiding a flow of influent following the flow path shown through the open channel into the sorption media. The system includes a distribution system for directing an influent into the underground drainfield, the distribution system including perforated inlet pipes 530 in each of the one or more open channels to promote aeration to maintain an aerobic condition in each channel and an air inlet port 540 in each of the one or more channels for drawing air for nitrification for an anoxic and aerobic environment where denitification occurs. A riser 550 located at one end of the underground drainfield in the sorption media 510 and extending a distance above the sorption media into the sand area, the riser 550 having a riser height less than a baffle height, the influent directed into each of the one or more open channels passing through the sorption media toward the riser 550, effluent passing over the riser 550; and a perforated outlet pipe 560 on an opposite side of the riser 550, the effluent passing through the outlet pipe 560 for disposal.

Another embodiment provides a method for on-site wastewater treatment by providing a horizontal underground cell including baffled compartments and a riser to host an alternating cycle of aerobic and anoxic environments, mixing one or more recycled material selected from a group consisting essentially of tires, sawdust and food waste and one or more naturally occurring materials as a green sorption material mixture, filling the horizontal underground cell with a green sorption material mixture to provide an anoxic environment and providing a piping system for dosing the horizontal underground cell with an influent to sustain the functionality of the green sorption material mixture in the passive drainfield to remove a nutrient content in wastewater. The method can be used in conjunction with underground septic tank systems as an alternating cycle of aerobic and anoxic environments to remove nutrient content from the influent.

In summary, pollutants of concern include nitrates, ammonia, total nitrogen, ortho-phosphorus, total phosphorus and BOD. Sorption media of interest include but are not limited to tire crumb, tree bark, wood chips, sawdust, paper (newspaper), alfalfa, mulch, cotton, wheat straw and sulfur/limestone. Two recipes with mixed sorption media were selected in the end of the initial literature for columns study. At the end of the column study, the recipe including sand, tire crumb and sawdust was further used to estimate the sorption life of the media mix and also as a media mix for the design of microcosm physical model. The drainfield shown in FIG. 5 is for illustration purposes only, those skilled in the art will understand that alternative configurations are available within the scope of the present invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested b y the teachings herein are particularly reserved especially as they fall within the breadth and scope of the claims here appended.

We claim:

1. A wastewater filtration system for a passive drainfield comprising:
    a green sorption material mixture consisting of sand, tire crumb, and sawdust;
    an internal cell filled and partitioned with the green sorption material mixture to provide an anoxic environment, the internal cell including baffled compartments and a riser to host the anoxic environment;
    an influent distribution system to distribute the influent over the cell, and
    a piping system arranged for dosing the cell to sustain the functionality of the green sorption material mixture in the passive drainfield to remove a nutrient content in wastewater.

2. The system of claim 1 wherein the filtration system is an on-site wastewater treatment system.

3. The system of claim I wherein the filtration system is a passive underground drainfield to remove a nutrient content in septic tank effluents and other waste streams in contaminated wastewater/groundwater systems.

4. The system of claim 1 wherein the filtration system is a passive underground drainfield to remove a nutrient content in contaminated wastewater/groundwater systems.

5. The system of claim 1 wherein the filtration system is a septic tank system.

6. The system of claim 1 wherein the filtration system is an in-situ remediation of nitrate and ortho-phosphate contaminated in groundwater.

7. A wastewater filtration system for a passive drainfield comprising:
    a green sorption material mixture consisting of sand, tire crumb, and paper;
    an internal cell filled and partitioned with the green sorption material mixture to provide an anoxic environment, the internal cell including baffled compartments and a riser to host the anoxic environment;
    an influent distribution system to distribute the influent over the cell, and
    a piping system arranged for dosing the cell to sustain the functionality of the green sorption material mixture in the passive drainfield to remove a nutrient content in wastewater.

8. The system of claim 7 wherein the filtration system is an on-site wastewater treatment system.

9. The system of claim 7 wherein the filtration system is a passive underground drainfield to remove a nutrient content in septic tank effluents and other waste streams in contaminated wastewater/groundwater systems.

10. The system of claim 7 wherein the filtration system is a passive underground drainfield to remove a nutrient content in contaminated wastewater/groundwater systems.

11. The system of claim 7 wherein the filtration system is a septic tank system.

12. The system of claim 7 wherein the filtration system is an in-situ remediation of nitrate and ortho-phosphate contaminated in groundwater.

* * * * *